(12) United States Patent
Bontemps et al.

(10) Patent No.: US 8,416,910 B2
(45) Date of Patent: Apr. 9, 2013

(54) METHOD AND DEVICE FOR SEALING A CANISTER LOADED WITH IRRADIATED NUCLEAR FUEL IN A COOLING POND

(75) Inventors: Virginie Bontemps, Avignon (FR); Jean-Claude Argoud, Montbonnot (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 12/161,765

(22) PCT Filed: Jan. 23, 2007

(86) PCT No.: PCT/EP2007/050625
§ 371 (c)(1),
(2), (4) Date: Nov. 3, 2009

(87) PCT Pub. No.: WO2007/085586
PCT Pub. Date: Aug. 2, 2007

(65) Prior Publication Data
US 2011/0091003 A1 Apr. 21, 2011

(30) Foreign Application Priority Data
Jan. 25, 2006 (FR) .................................... 06 50258

(51) Int. Cl.
*G21C 19/02* (2006.01)
*G21K 1/00* (2006.01)
*G21C 19/00* (2006.01)

(52) U.S. Cl.
USPC ..... 376/272; 376/260; 250/505.1; 250/506.1; 220/200; 220/315

(58) Field of Classification Search ............... 376/260, 376/272, 347; 220/23.2–23.91, 200, 315, 220/600, 610, 612; 250/505.1, 506.1, 507.1, 250/515.1–519.1
See application file for complete search history.

(56) References Cited

U.S. PATENT DOCUMENTS

| 3,113,215 | A | * | 12/1963 | Allen | 250/506.1 |
| 3,732,423 | A | * | 5/1973 | Peterson | 250/506.1 |
| 3,754,140 | A | * | 8/1973 | Beierle | 250/507.1 |
| 3,917,953 | A | * | 11/1975 | Wodrich | 250/506.1 |
| 3,997,078 | A | * | 12/1976 | Melton et al. | 220/315 |
| 4,353,391 | A | * | 10/1982 | Belmonte et al. | 376/272 |
| 4,377,509 | A | * | 3/1983 | Haynes et al. | 376/272 |

(Continued)

FOREIGN PATENT DOCUMENTS

| DE | 25 31 410 A1 | 2/1977 |
| DE | 27 06 042 A1 | 8/1978 |

(Continued)

OTHER PUBLICATIONS

International Search Report for PCT/EP2007/050625; Jul. 30, 2007.

(Continued)

*Primary Examiner* — Bernarr Gregory
(74) *Attorney, Agent, or Firm* — Pearne & Gordon LLP

(57) ABSTRACT

Method for packing nuclear fuel in a cooling pond in a canister (12) located inside a container (10), comprising the steps of the immersion of the canister (12) and the container (10), filling the canister (12), fitting a sealing device (D) comprising caps and means of attaching a cap onto said canister (12) and of checking this attachment.

17 Claims, 3 Drawing Sheets

U.S. PATENT DOCUMENTS

| | | | | |
|---|---|---|---|---|
| 4,436,693 A | * | 3/1984 | Zezza et al. | 376/272 |
| 4,582,668 A | * | 4/1986 | Mallory et al. | 376/272 |
| 4,673,814 A | * | 6/1987 | Schroeder et al. | 220/612 |
| 4,836,975 A | * | 6/1989 | Guldner et al. | 376/272 |
| 5,064,575 A | * | 11/1991 | Madle et al. | 220/23.87 |

FOREIGN PATENT DOCUMENTS

| | | |
|---|---|---|
| DE | 89 06 938 U1 | 8/1989 |
| FR | 2 806 828 A | 9/2001 |
| JP | 61-294396 A | 12/1986 |
| JP | 2007-085811 A | 4/2007 |

OTHER PUBLICATIONS

French Search Report for FR0650258; Jun. 29, 2006.

\* cited by examiner

METHOD AND DEVICE FOR SEALING A CANISTER LOADED WITH IRRADIATED NUCLEAR FUEL IN A COOLING POND

TECHNICAL FIELD AND PRIOR ART

This invention relates to a method for packing irradiated nuclear fuel into a cooling pond and to a device for sealing canisters containing irradiated nuclear fuel in a cooling pond, for temporary storage or retreating, or even storage in a deep site.

Part of the management of irradiated fuels, after they have been used in a reactor, includes them undergoing a step where they are cooled in a cooling pond in a building, called the fuel building, which is generally located next to the reactor building.

When this cooling step is complete, the irradiated fuels are removed from the cooling pond, and then taken to a temporary storage location until they are definitively disposed of either by retreating, or by geological storage.

The cooling step in a cooling pond is of limited duration due to the reduced capacity of the cooling ponds.

Within this context, it may be envisaged to pack the irradiated fuels in canisters forming the first confinement barrier, wherein each canister is itself placed inside a container forming a second confinement barrier and providing the mechanical resistance of the assembly. This container is designed for the transport of the canister to its temporary storage location.

At present, irradiated nuclear fuels are packed in hot cells, which provide the confinement and radiation protection by means of shielded walls. These hot cells have the disadvantage of using heavy and costly constructions.

The document FR 2 806 828 discloses a device for sealing under water a canister of irradiated fuel comprising a bell jar designed to seal tightly an open end of the canister, wherein a robot is taken inside the bell jar via a tube, connecting the bell jar to the outside environment, wherein this robot is designed to attach the cap onto the canister.

The device permits a tube to be inserted to suck out the water inside the canister prior to the cap being fitted.

This device and its associated method do not provide safe packing of the nuclear fuel, as no verification of the sealed confinement of the canister is carried out. Furthermore, when the irradiated fuel is removed from the cooling pond, a single biological protection formed by the canister separates it from the outside environment.

Furthermore, the bell jar is connected to the outside environment by a duct permitting the passage, especially by means of welding. Consequently the sealed confinement of the radiation is difficult to implement.

The document DE 8 906 938 describes an installation for confining nuclear fuel in a canister, wherein this installation is located in a pool.

This two part installation comprises a lower cylindrical housing inside which the canister is directly placed before being filled with the fuel and a bell jar covers the top of the container. At the bottom of the lower housing is an evacuation for the water contained in the canister.

This storage only provides a single biological barrier formed by the canister.

Furthermore, this installation is very large and difficult to handle, and especially to transport to be placed in other cooling ponds.

Furthermore, no verification of the sealed confinement of the container is described.

Consequently one purpose of this invention is to propose a method for packing irradiated nuclear fuel which permits storage in open air without the risk of radiation.

Another purpose of this invention is to propose a device which permits irradiated nuclear fuel to be packed in a cooling pond safely in packing offering double biological protection.

Another purpose of this invention is to propose a device for sealing canisters in cooling ponds which is relatively cheap compared to the known devices.

DESCRIPTION OF THE INVENTION

The purposes mentioned above are achieved by a method for packing nuclear fuel in a cooling pond, comprising the steps of:
  immersion in the cooling pond of a canister inside a container,
  fitting the sealing device on top of the container,
  lowering the level of the water in the sealing device to a level below that of the open end of the container,
  fitting a cap onto the canister,
  withdrawing the water from the canister,
  verifying the sealed confinement.

A device according to this invention comprises a bell jar that can cover the container which holds the canister, wherein the bell jar is equipped with means of attaching the cap onto the canister, emptying and drying the canister, verifying the absence of water in the canister and the sealed confinement obtained by the cap.

The bell jar is stored in the cooling pond and is positioned above a container to cover it when the nuclear fuel is packed.

The device according to this invention has the advantage of being easy to transport. It allows the fuels to be packed directly in their temporary storage cooling pond, as well as rendering heavy means, such as hot cells, no longer necessary. The operating cost of such a device is therefore reduced.

Furthermore, packing directly in a cooling pond offers the benefit of the biological protection provided by the water and avoids the transport of irradiated fuel without totally safe biological and mechanical protection.

The bell jar has equipment which permits the fuels elements to be dried, a sealed cover to be welded onto the canister and the sealed confinement to be checked. All of the operations are carried out remotely and underwater.

The subject-matter of the invention is therefore a method for packing nuclear fuel in a cooling pond inside a canister contained in a container, comprising the steps of:
  immersion of the container and the canister in the cooling pond,
  loading of the canister with nuclear fuel,
  fitting a canister device for sealing the top of the container, wherein said device at least comprises a first canister cap,
  maintaining a pneumatic fluid pressure in the device so as to maintain the water level at a level below that of an open end of the packing,
  attachment of a cap onto an open end of the canister by means contained inside the device,
  emptying the canister by emptying means inside the device,
  verification of the sealed confinement provided by the cap,
  withdrawal of the device.

When emptying the canister, the water is withdrawn by means of a pump, and then the canister is swept with gas to dry the interior of the canister.

Advantageously, after emptying, a check is made in the absence of water in the canister, for example by measuring the rise in pressure.

The verification of the sealed confinement may include:
- sweeping with helium of the interior of the canister and pressurising the interior of the canister with helium,
- use of a helium spectrometer to detect any helium leaks.

Preferably, the first cap is attached by welding.

A second cap contained in the sealing device, is advantageously attached to the first cap prior to the withdrawal of the sealing device, wherein the latter may comprise gripping means.

It is also possible to provide a cap on the container after the withdrawal of the sealing device.

Very advantageously, the packing and sealing device are located in a determined position relative to one another, especially permitting the confinement method to be automated.

The subject-matter of the invention is also a device for sealing a canister located inside a container in a cooling pond, wherein said canister is loaded with irradiated fuel, comprising a bell jar, at least one first cap equipped with connectors, means of fitting said cap onto the canister, means for attaching the cap onto the canister, means of withdrawing the water, means of verifying the complete withdrawal of the water and means of controlling the sealed confinement of the canister on the cap.

The sealing device may comprise an arm forming the means of fitting the cap onto the canister.

The emptying means may comprise a pump and means of sweeping the canister with gas so as to dry it, wherein said pump and said sweeping means may be connected by at least one connector.

Preferably, the means of verifying the seal comprise means of injecting helium into the canister and a helium spectrometer; the means of injecting helium may be connected to at least one connector.

The attachment means are advantageously welding means, wherein these means are brought close to the canister by an arm located inside the bell jar.

Advantageously, the sealing device may contain a device for storing several first caps, permitting several canisters to be confined without having to raise the sealing device.

The sealing device may also comprise a device for storing several second caps designed to be attached to the first caps.

BRIEF DESCRIPTION OF THE DRAWINGS

This invention will be more clearly understood upon reading the following description and the appended drawings, among which.

DETAILED DESCRIPTION OF SPECIFIC EMBODIMENTS

Figure 1A:
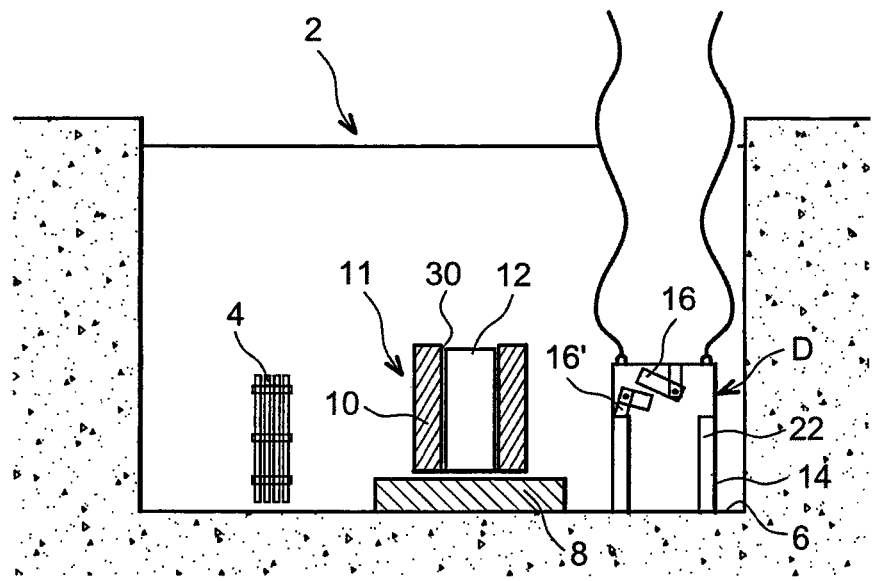
FIGS. 1A and 1B are des diagrammatical representations of the environment of implementation of the method and the device according to this invention in a rest mode and a confinement mode, respectively.
Figure 1B:
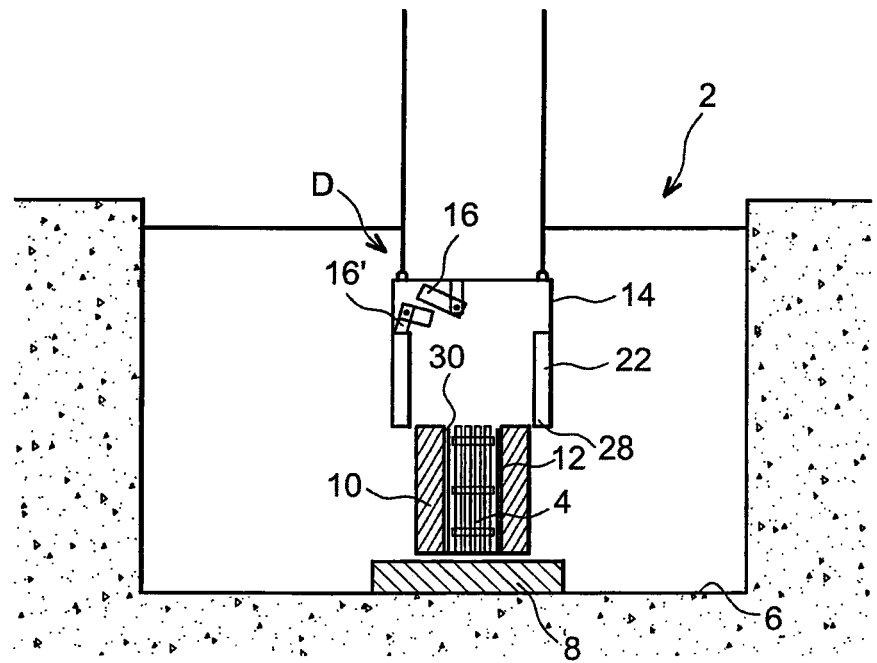

FIGS. 1A and 1B show a cooling pond 2 filled with water in which irradiated nuclear fuels 4 are stored to be cooled. These fuels may be in the form of an assembly of several fuel pencils or fuel plates or any other form.

This cooling pond may accommodate a sealing device D according to this invention which may be kept immersed in the cooling pond even when it is not used.

The cooling pond 2 comprises a bottom 6 equipped with a base 8 to hold a container 10 inside which a canister 12 is located. This canister 12 is designed to contain the irradiated fuel and forms a first confinement barrier, wherein the container 10 itself forms a second confinement barrier and also provides the mechanical resistance of the assembly.

The container 10 is designed to provide the biological confinement and its mechanical protection during transport to a temporary storage location.

In the rest of the description, the container 10 and canister 12 assembly will be called packaging and indicated by the reference 11.

Figure 2:
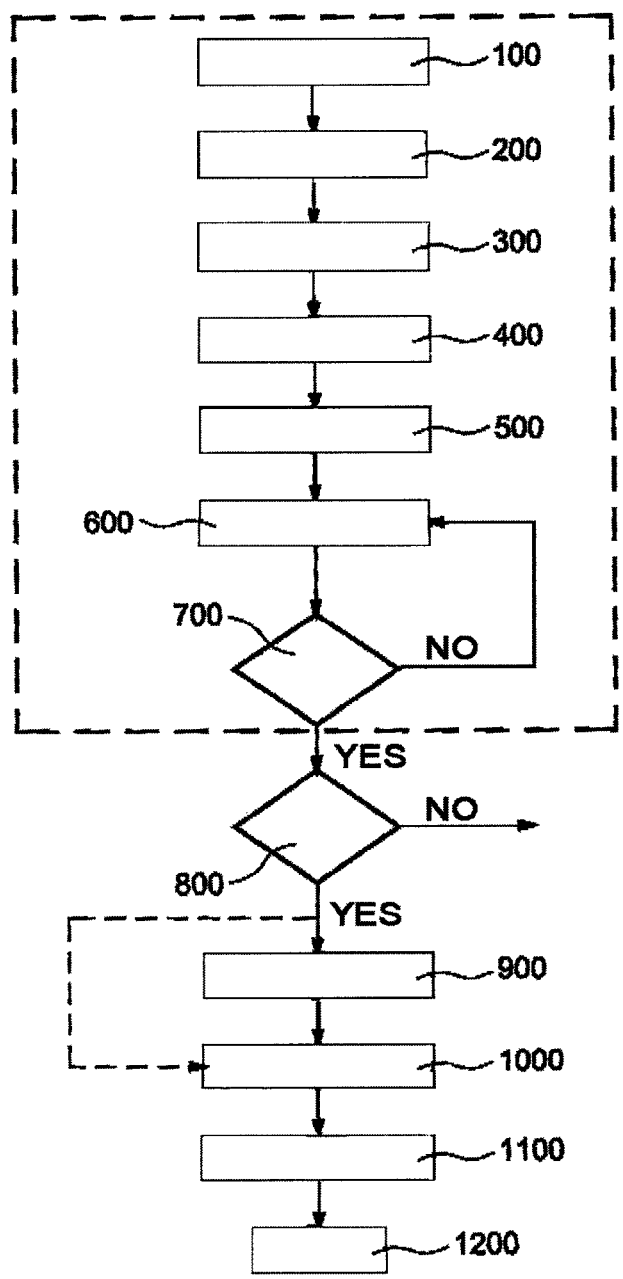
FIG. 2 is a diagram of the various steps of the method according to this invention.

The method according to the invention is shown in block diagram form in FIG. 2 and especially provides that:
- in step 100, the container 10 into which the canister 12 has already been placed is immersed,
- in step 200, the canister 12 is filled with the irradiated fuel,
- in step 300, the device D is placed above the packaging so as to cover the packaging, wherein a lower end 28 of the device rests on the base 8 in the bottom of the cooling pond (FIG. 3),
- in step 400, the water level is maintained at a level that is below an open end 30 of the packaging 11,
- in step 500, a cap is fitted onto the canister and attached to it tightly, wherein the sealing device has means permitting the water contained in the canister to be removed, of drying the inside of the canister and of checking the confinement seal it makes for leaks,
- in step 600, the water contained in the canister is withdrawn,
- in step 700, the canister is checked to ensure that there is no water present,
- in step 800, the sealed confinement of the canister is checked.

Figure 3:
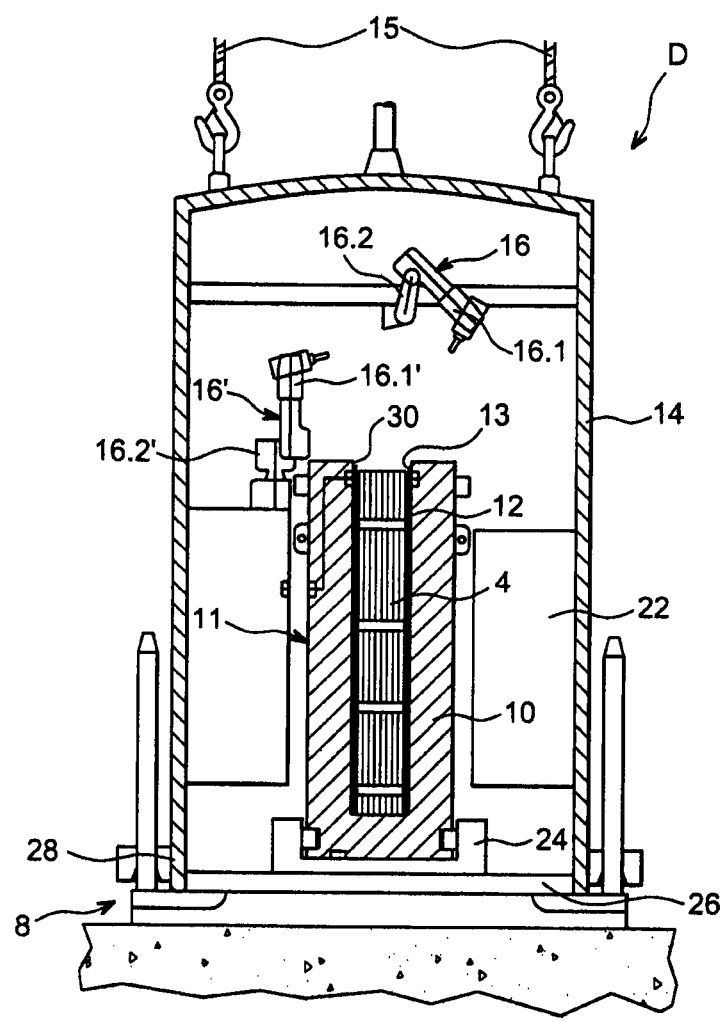
FIG. 3 is a longitudinal cross sectional view of a loading device according to this invention.

The device D, shown in the FIG. 3, comprises a bell jar 14 with substantially a cross section that is in the form of an inverted U, that may be moved in the cooling pond so that it may be positioned above the packaging.

The bell jar may be moved by means of slings 15 attached to an upper part of the bell jar and connected to an overhead crane.

The bell jar 14 has means of fitting the caps, means of attaching them for example by welding, means of emptying the interior of the canister, means of checking for the absence of water in the canister and means of verifying the sealed confinement of the canister (not shown) operating with the cap connectors.

The bell jar 14 comprises at least one arm, two arms 16, 16' in the example shown, to implement the means mentioned above.

In the example shown in FIG. 3, the device according to the invention comprises an arm 16' for fitting the caps and an arm 16 for welding the caps and verifying the confinement.

The arms 16, 16' are , for example formed by two elongated members 16.1, 16.1', 16.2, 16.2', articulated with respect to one another, wherein one of the members is equipped for example with gripping means (not shown), such as a clamp.

The arms 16, 16' may be controlled externally by operators or be moved by a computer programme without external intervention.

The arm 16' fits the caps, and advantageously fits the air or helium inlet tubes and attaches them to the cap connectors.

The bell jar 14 advantageously comprises a device for storing 22 several canister caps. In the example shown in FIG.

3, this device 22 is placed on an inside wall of the bell jar 14. The storage in the bell jar 14 avoids having to raise the bell jar again between each confinement of a canister.

Advantageously, this storage device permits two types of cap to be stored, a first type designed to be in contact with the nuclear fuel and a second type comprising means of gripping the canister and designed to be attached to an outside face of the first cap.

Advantageously, the two types of cap are stored in distinct storage devices.

The base 8 comprises means of positioning the bell jar 14 and the packaging 11 in a relative position that is identical to each loading of a canister 12.

The base 8 comprises, for example a housing 24 with an internal diameter substantially equal to the external diameter of the packaging 11, and a disc 26 with an external diameter substantially equal to the internal diameter of a lower open end 28 of the bell jar 14, wherein the disc 26 and the housing 24 are coaxial in the example shown.

Consequently, when the bell jar 14 is fitted onto the base 8, it is positioned in a unique position, as does the canister 12. It is therefore possible to automate the confinement method, as the positions of the packaging, especially the canister and the bell jar are always the same; the arms may then be moved in line with a pre-established command, without the intervention of an operator during the confinement steps.

We will now describe in detail the specific steps of the method according to this invention.

In step 100, the packaging 11 is immersed and fitted to the housing 24 of the base 8.

In step 300, the device 300 is positioned above the packaging 11, the lower end 28 of the bell jar 14 moves into position around the disc 26 of the base 8. Each packaging element 11 and the bell jar 14 are always in the same relative position.

In step 400, the water level is maintained below the open end 30 of the packaging 11 by a pressurising system which injects gas, for example pressurised air into the bell jar. Consequently, the upper end 30 of the packaging 11 is in the air even though it is positioned in the cooling pond, and the canister 12 may be confined in a dry environment while still benefiting from the biological protection provided by the water.

Advantageously, the inside of the bell jar 14 is kept dry permanently by the pressurising system, to limit any potential damage to the equipment it contains. Furthermore, when it is fitted to the packaging, the water level is maintained by the pressurising system.

In step 500, a first cap is removed from its storage device 22 by the arm 16 and is placed on the open end 13 of the canister 12 so that it seals it completely.

The first caps comprise connectors which permit the drying to be controlled and Helium to be injected into the canister. These connectors are of the self-sealing type, well known to a person skilled in the art. After the helium has been injected into the canister, the end of the connectors is welded.

As will be described below, these connectors permit to check for the presence of water in the canister and the sealed confinement provided by the cap once the cap has been fitted.

The connectors also permit the canister to be emptied according to the step 600.

This cap is then attached to the canister 12, advantageously by welding. It may also be provided that the cap is screwed on. The welding is for example tungsten welding (TIG).

In step 600, the water contained in the canister is removed by means of a pump connected to the end of a connector of the cap. In addition to the extraction by means of a pump, it is provided to dry the inside of the canister by sweeping, for example with air.

It may be envisaged to withdraw the water before fitting the cap.

The canister 12 is centred in the container 10, which is itself centred in the part 24.

In step 700, a verification is made of the absence of water in the canister, for example by measuring the pressure build up. This measurement consists of placing the canister in a depression and verifying the stability of the depression.

If the measurement shows that there is still water in the canister, step 600 is repeated, especially as concerns the drying by sweeping with air. Then a new verification is carried out according to the step 700.

If the measurement shows that the inside of the canister is dry, then step 800 is carried out, to verify the confinement seal provided by the cap and the weld. For example, a connector of the cap is used to inject a gas, advantageously helium, then using a helium spectrometer a check is made for helium leaks on the weld.

If a leak is detected, which is to say that the weld has a fault, then step 1300 is carried out. In this step 1300, it may be provided that this weld is repaired if it is only a small fault. Otherwise the operations are stopped, the bell jar is removed, the canister is also removed from the packaging, then opened to recover the fuel.

If no leaks are detected, then step 900 may be carried out, to remove a second cap from the storage device, and to attach it, for example by welding, onto the first cap. This second cap permits the canister to be gripped. For the welding, the means used to weld the first cap onto the canister may be used.

If a second cap is not attached to the first cap, then step 1000 is carried out directly (arrow in dotted lines).

In a later step 1000, the bell jar is removed.

Then in step 1100, a cap is fitted to the container.

It may also be envisaged to fit the cover onto the container when the bell jar is present.

In step 1200, the container equipped with the loaded canister is removed from the cooling pond.

The device for sealing according to this invention comprises a bell jar and all means required to implement the method as previously described.

The sealing device therefore comprises:
a bell jar,
at least one first cap equipped with connectors,
an arm to fit said cap onto the canister,
means of attaching the cap onto the canister,
means of withdrawing the water, formed for example by a pump and gas sweeping means,
means of verifying the total withdrawal of the water by measuring a pressure rise, and,
means of checking the sealed confinement of the canister on the cap, by injecting helium and detecting a helium leak using a helium spectrometer.

Consequently, this device is completely autonomous and isolated from the outside environment by its immersion in the cooling pond. No radiation leaks may occur, as no transfer of equipment between the bell jar and the environment exposed to the air takes place.

It may be further provided that the sealing device operates according to a determined sequence without human intervention. On the contrary, it may be provided that each step is controlled by an operator.

The bell jar measures for example 2 meters in diameter and 3 meters in height.

The sealing device according to this invention advantageously permits heavy means such as hot cells to be avoided, for the packing of the irradiated fuel.

The sealing device according to this invention offers the advantage of being able to be transported to different places; therefore it may be used for several cooling ponds, which permits costs to be reduced.

Furthermore, the packing in a cooling pond permits the biological protection provided by the water to be conserved.

Furthermore, the use of a canister inside a container makes possible the use of a first cover without internal biological protection. The first cover then has a small thickness. Consequently the height of the canister is reduced, which results in better filling of the temporary storage devices.

The invention claimed is:

1. Method for confining a canister contained in a container in a cooling pond, wherein said canister is loaded with nuclear fuel, comprising the steps of:
    immersion of the packaging comprising the container and the canister, in the cooling pond,
    loading the canister with nuclear fuel,
    fitting a device for sealing the canister on top of a container, wherein said device comprises at least one first canister cap,
    maintaining a pneumatic fluid pressure in the sealing device so as to maintain the water level at a level below that of an open end of the packaging,
    attachment of a cap onto an open end of the canister by means contained inside the sealing device,
    emptying the canister by emptying means inside the device,
    verification of the sealed confinement provided by the cap,
    withdrawal of the sealing device.

2. Method according to claim 1, wherein when the canister is emptied, the water is withdrawn using a pump, then sweeping with gas is carried out in the canister to dry the inside of the canister.

3. Method according to claim 1, wherein after emptying, a verification is carried out of the absence of water in the canister.

4. Method according to claim 3, wherein the verification of the absence of water is carried out by measuring the pressure build up.

5. Method according to claim 1, wherein the verification of the sealed confinement comprises:
    sweeping with helium of the interior of the canister and pressurising the interior of the canister with helium,
    use of a helium spectrometer to detect any helium leaks.

6. Method according to claim 1, wherein the first cap is attached by welding.

7. Method according to a claim 1, wherein a second cap contained in the sealing device, is attached to the first cap prior to the withdrawal of the sealing device.

8. Method according to claim 1, wherein a cap is fitted onto the container after withdrawal of the sealing device.

9. Method according to claim 1, wherein the packaging and the sealing device are positioned in a determined relative position with respect to one another.

10. Device for sealing a canister contained in a container in a cooling pond, wherein said canister is loaded with irradiated fuel, said device comprising
    a bell jar designed to cover an open end of the container, said bell jar being designed to contain at least one first cap equipped with connectors,
    means capable of maintaining a pneumatic fluid pressure in the bell jar so as to maintain the water level at a level below that of the open end of of the loaded container of the canister,
    said bell jar comprising
    a positioner for fitting said cap onto the canister,
    a fastener device for attaching the cap onto the canister,
    exhauster for withdrawing the water,
    means of verifying the total withdrawal of the water, and
    checker for checking the sealed confinement of the canister on the cap.

11. Device according to claim 10, comprising an arm forming the positioner for fitting the cap.

12. Device according to claim 10, wherein the exhauster for withdrawing the water comprises a pump and means of sweeping the canister with gas in order to dry it, wherein said pump and said sweeping means may be connected to at least one connector.

13. Device according to one of claims 10, wherein the checker for verifying the seal comprise an injector of helium into the canister and a helium spectrometer.

14. Device according to claim 13, wherein the injector of helium may be connected to at least one connector.

15. Device according to any of claims 10, wherein the fastener device is welding device, this device brought close to the canister by an arm inside in the bell jar.

16. Device according to claim 10, comprising a device for storing several first canister caps.

17. Device according to claim 10, comprising a device for storing several second caps designed to be attached to the first caps.

* * * * *

UNITED STATES PATENT AND TRADEMARK OFFICE
CERTIFICATE OF CORRECTION

PATENT NO.       : 8,416,910 B2
APPLICATION NO.  : 12/161765
DATED            : April 9, 2013
INVENTOR(S)      : Bontemps et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this
Fourth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,416,910 B2  Page 1 of 1
APPLICATION NO. : 12/161765
DATED : April 9, 2013
INVENTOR(S) : Bontemps et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this
First Day of September, 2015

Michelle K. Lee
*Director of the United States Patent and Trademark Office*